United States Patent [19]

Fuchs

[11] 4,389,792
[45] Jun. 28, 1983

[54] DRILL CORE INCLINOMETER

[75] Inventor: Heinz Fuchs, Recklinghausen, Fed. Rep. of Germany

[73] Assignee: Ruhrkohle A G, Essen, Fed. Rep. of Germany

[21] Appl. No.: 225,402

[22] Filed: Jan. 15, 1981

[30] Foreign Application Priority Data

Jan. 5, 1980 [DE] Fed. Rep. of Germany ....... 3000319

[51] Int. Cl.³ ...................... E21B 47/022; G01C 9/14
[52] U.S. Cl. ..................................... 33/304; 33/313; 33/397
[58] Field of Search ................ 33/304, 308, 310, 313, 33/397

[56] References Cited

U.S. PATENT DOCUMENTS

| | | | |
|---|---|---|---|
| 963,242 | 7/1910 | Osterberg | 33/310 |
| 1,152,701 | 9/1915 | Borresen | 33/313 |
| 1,845,889 | 2/1932 | Schoolcraft | 33/304 |
| 1,987,696 | 1/1935 | McLaughlin et al. | 33/304 |
| 2,313,168 | 3/1943 | Opocensky | 33/313 |
| 3,008,241 | 11/1961 | Murata | 33/310 |
| 3,047,961 | 8/1962 | Suter | 33/308 |

FOREIGN PATENT DOCUMENTS

| | | | |
|---|---|---|---|
| 12271 | of 1906 | United Kingdom | 33/304 |
| 23003 | of 1909 | United Kingdom | 33/304 |
| 422841 | 10/1974 | U.S.S.R. | 33/304 |

*Primary Examiner*—Richard R. Stearns
*Attorney, Agent, or Firm*—Michael J. Striker

[57] ABSTRACT

A drill core inclinometer is releasably mountable in a core barrel and includes a device for measuring the vertical and transverse inclination of the drill core before the core is detached from the matrix. The device, once it has effected the measurements, is arrested so that the measurements are retained and remain unaffected while the core is brought to the surface.

7 Claims, 2 Drawing Figures

DRILL CORE INCLINOMETER

BACKGROUND OF THE INVENTION

This invention relates to a device for measuring the inclination of a cylindrical core produced by drilling of horizontal or inclined drill holes.

Core drilling is the process of obtaining cylindrical rock and earth samples by means of a hollow, annular cutting bit which is rotated by a bore-hole drilling machine so as to produce a cylindrical core. The purpose of obtaining the core is to subject it to geological examination, in order to draw conclusions as to the nature of the rock and strata of soil into which the bore hole is being driven. The cores are pulled out of the bore hole by a rope through a core barrel.

A problem with the prior art is that examination of the recovered core cannot furnish any information about the inclination or transverse inclination of the core.

SUMMARY OF THE INVENTION

Accordingly, it is an object of the invention to overcome the prior-art disadvantages.

A more particular object is to provide a device for measuring and indicating drill core inclinations.

In pursuance of these objects and still others which will become apparent hereafter, one aspect of the invention resides in a drill core inclinometer having a hollow cylindrical member which is closed at its ends and located in, and releasably connected with, the core barrel. A measuring device is provided, which is mounted so as to be turnable about two mutually inclined axes. This device is gravity-oriented, i.e. it will always tend to assume a position dictated by its center of gravity. An arresting device is coupled with a timing mechanism which can trigger it, so that the arresting device arrests the measuring device in whatever position the same is at that time.

It is particularly advantageous if the measuring device includes a so-called pendulum wheel having a turning axis which extends transversely to the longitudinal axis of the cylindrical member. The shaft defining this transverse turning axis for the wheel may be journalled in a longitudinal shaft extending lengthwise in the cylindrical member and having a bifurcated front end and a ball-bearing supported hollow rear end.

Another especially advantageous aspect provides for the arresting device to include a piston which is mounted on the longitudinal axis of the cylindrical member and extends into the hollow rear of the longitudinal shaft. This piston may be spring-biased and serve to arrest the measuring device in the particular position of the same by spring-tension which is triggered by a timing mechanism of known-per-se construction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
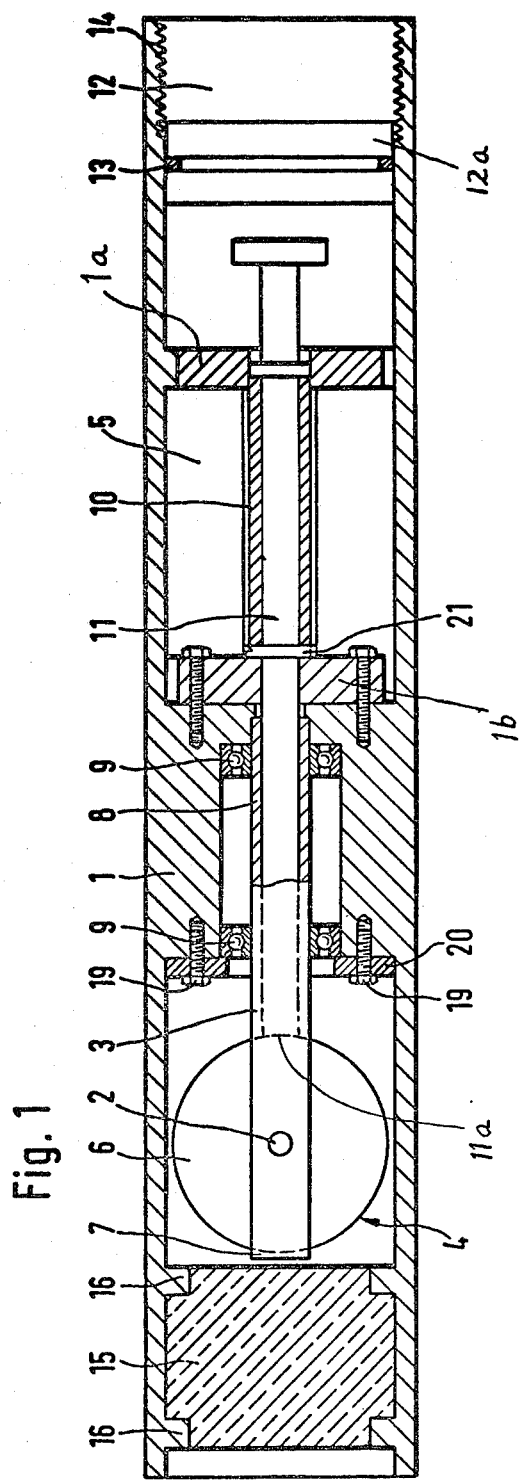
FIG. 1 is a somewhat diagrammatic axial section through a device according to the invention.

Reference numeral 1 in FIG. 1 identifies a hollow cylindrical member, preferably of non-rusting material, such as rust-free steel, which is pressure resistant. It is closed at its axial ends. At the trailing end the member 1 is closed by a pressure-resistant glass plate 15 (e.g. quartz) which is held by inner ring-shaped beads 16 of member 1. The leading end is closed by a closure screw 12 which is threaded into internal threads 14 and with its part 12a engages an O-ring 13 to effect a watertight seal therewith.

Mounted inwardly of glass plate 15 is an inclination-measuring device 4 which can turn about two mutually normal axes. The device 4 includes a pendulum wheel 6 which is, such called because it is weighted so that, when not arrested, it will automatically orient itself in accordance with gravity. Wheel 6 is mounted on a shaft 2 which is itself turnably mounted in the leading end portion 7 of another shaft 3 that extends axially through the member 1. The end portion 7 is bifurcated (not shown) whereas the remainder 8 of shaft 3 is hollow and turnably journalled in anti-friction bearings 9. These latter are retained by a ring 20 which is held by screws 19.

A piston 11 extends through the rear open end into the hollow portion 8 and towards the front open end of the hollow. It is surrounded by a helical expansion spring 10 which bears with one end upon a transverse wall 1a and with its other end upon an annular shoulder 21 of piston 11. The piston extends through an opening in wall 1a, so that it can be pushed rightwards in FIG. 1, whereby the spring 10 is compressed and the leading end 11a of the piston 11 can be withdrawn from contact with the wheel 6.

A timing device (not shown, but known per se is) provided which may, e.g. be in form of a mechanical clockwork that is keywound and spring-operated. The piston 11 is so connected to one of the gears of the clockwork that when the gear is turned in the appropriate direction, the piston 11 is moved rightwardly in FIG. 1 and is maintained in this position until the preset time selected with the clockwork has expired. This causes the piston 11 to be released, so that the spring 10 can expand and push the piston 11 leftward, until the leading end 11a engages the wheel 6 and prevents the same from turning on the axis defined by shaft 2. At the same time, engagement of the shoulder 21 with the wall 1b comes about and prevents turning of the shaft 3 about its longitudinal axis. The timing mechanism may surround the spring 10 in the space 5.

Figure 2:
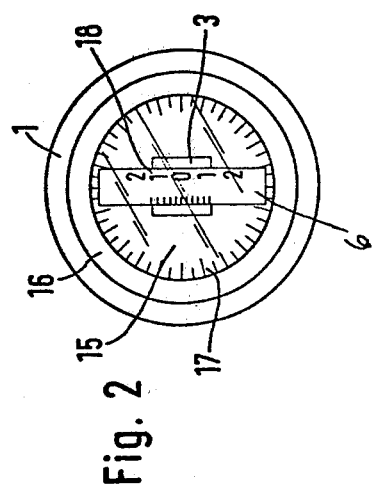
FIG. 2 is an end view of FIG. 1, seen from the left.

FIG. 2 shows that the inner surface of plate 15 is provided with a scale 17 graduated in e.g. 10° segments and surrounding the longitudinal axis of shaft 3. This serves to identify transverse inclination of the core. There is also a dial 18 which serves to identify the vertical inclination; it is provided on the circumferential edge face of the wheel 6.

To effect a measurement the device illustrated in FIGS. 1 and 2 is fixedly connected with the core barrel and the timing mechanism set for the desired time delay. Drilling then commences, but must be stopped shortly before the preset time has expired; i.e. the drill must not be moved at the time the timing mechanism releases the piston 11 because that would falsify the measured results. After expiration of the time delay the core is severed (torn off) but without being rotated, and the core barrel is then brought to the surface. When its lower (leading) end is opened the plate or window 15 becomes visible. Since the wheel 6 was fixed against turning before the core was severed from the matrix, the inclination of the bore hole in drilling direction can be read directly off the dial 18.

Since the wheel 6 is absolutely normal relative to the drilling direction, the core barrel can be oriented to the vertical with the aid of a level or dropline, i.e. to make the dropline and wheel register. The core can therefore be drawn in the core barrel in its zenith position.

The core is now oriented as to the vertical inclination of the bore hole and as to the transverse inclination of the core. It is then only necessary to position the core in alignment with the bore hole. If a marking device is present in the core barrel, it is set for the zenith prior to operation and the difference between the zero mark and the vertical is read off the scale 17. After the core is brought to the surface the procedure is repeated. The core zenith will then be offset from the setting of the marking device by an amount equal to the difference between the two readings.

It will be appreciated from the above that it is one of the important advantages of the invention that the invention permits a determination of vertical and transverse inclination of the core in a simple, time-saving and reliable manner.

While the invention has been illustrated and described as embodied in other types of applications, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Device for measuring vertical and transverse inclination of drill cores which are removed from below ground via a core barrel, comprising a hollow cylindrical member having sealed axial ends and being adapted to be releasably mounted in the core barrel; a gravity-oriented inclination measuring device mounted in said member for turning movement about two mutually normal axes; and arresting means for arresting said device against said turning movement at a predetermined time prior to removal of the drill core from a bore hole, said measuring device including a first shaft extending lengthwise in said member journalled therein turnable about one of said axes and having a bifurcated leading end portion, an eccentrically weighted wheel, and a second shaft mounting said wheel on said leading end portion turnable about the other of said axes, said first shaft having a longitudinal passage extending from said leading end portion to a trailing end of the first shaft; said arresting means comprising a piston having one portion slidable in said passage and provided with a free end face engageable with said wheel to prevent turning of the same.

2. Device as defined in claim 1; and further comprising anti-friction bearing means journalling said first shaft in said member.

3. Device as defined in claim 1, said piston having another portion outside said passage, and further comprising a spring urging said piston to move towards said wheel.

4. Device as defined in claim 1, one of said axial ends being a leading end and including an internal thread, a screw meshing with said thread, and an O-ring sealingly engaging said screw and said member.

5. Device as defined in claim 4, one of said axial ends being a trailing end and including a pressure-resistant glass window, the position of said wheel turnable about the other of said axes being visible through said window, said window having an inner side provided with an annular graduated measuring scale for indicating transverse drill core inclination in accordance with the position of said wheel.

6. Device as defined in claim 5, wherein said scale is graduated in increments of 10°.

7. Device as defined in claim 5, said wheel having a circumferential edge face provided with a graduated dial to indicate vertical inclination of the drill core prior to removal from the bore hole.

* * * * *